United States Patent
Lee et al.

(10) Patent No.: US 10,955,957 B2
(45) Date of Patent: Mar. 23, 2021

(54) ELECTRONIC DEVICE FOR VARIABLY DISPLAYING DISPLAY POSITION OF OBJECT ON EXPANSION AREA OF DISPLAY AND METHOD OF DISPLAYING

(71) Applicant: SAMSUNG ELECTRONICS CO., LTD., Suwon-si (KR)

(72) Inventors: Min Sung Lee, Suwon-si (KR); Na Young Kim, Seoul (KR); Ha Rim Kim, Seoul (KR); Na Kyoung Lee, Seongnam-si (KR); Hyun Soo Kim, Yongin-si (KR); Dong Hyun Yeom, Bucheon-si (KR); Chang Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/878,805

(22) Filed: Jan. 24, 2018

(65) Prior Publication Data
US 2018/0224963 A1  Aug. 9, 2018

(30) Foreign Application Priority Data
Feb. 3, 2017  (KR) .................. 10-2017-0015735

(51) Int. Cl.
*G06F 3/041* (2006.01)
*G06F 3/0488* (2013.01)
(Continued)

(52) U.S. Cl.
CPC .......... *G06F 3/04142* (2019.05); *G06F 3/017* (2013.01); *G06F 3/0488* (2013.01);
(Continued)

(58) Field of Classification Search
CPC ........ G06F 3/044; G06F 9/451; G06F 3/0414; G06F 3/0416
See application file for complete search history.

(56) References Cited

U.S. PATENT DOCUMENTS

| 9,557,844 B2 | 1/2017 | Lee et al. |
| 9,766,760 B2 | 9/2017 | Jeong et al. |

(Continued)

FOREIGN PATENT DOCUMENTS

| EP | 2879037 | 6/2015 |
| EP | 2947538 | 11/2015 |

OTHER PUBLICATIONS

Extended Search Report dated Jun. 4, 2018 in counterpart European Patent Application No. 18154898.3.

*Primary Examiner* — Kent W Chang
*Assistant Examiner* — Scott Au
(74) *Attorney, Agent, or Firm* — Nixon & Vanderhye P.C.

(57) ABSTRACT

An electronic device is provided. The electronic device may include a display including a front surface area and a side surface area disposed in at least one side of the front surface area, a first sensor included under the side surface area and configured to sense pressure applied to the side surface area; and a processor operatively connected with the display and the first sensor. The processor may be configured to determine a position of at least one point of the side surface area corresponding to the sensed pressure, if the sensed pressure using the first sensor is within a first specified range, and to display at least one graphic object on an area corresponding to the determined position.

15 Claims, 18 Drawing Sheets

510:LEFT HAND GRIP

520:RIGHT HAND GRIP

(51) Int. Cl.
  *G06F 3/01*   (2006.01)
  *G06F 3/044*   (2006.01)
(52) U.S. Cl.
  CPC ........ *G06F 3/04186* (2019.05); *G06F 3/0446* (2019.05); *G06F 2203/04101* (2013.01); *G06F 2203/04105* (2013.01)

(56) References Cited

U.S. PATENT DOCUMENTS

| | | |
|---|---|---|
| 9,933,936 B2 | 4/2018 | Lee et al. |
| 2015/0145796 A1 | 5/2015 | Lee et al. |
| 2015/0248181 A1 | 9/2015 | Jeong et al. |
| 2015/0339055 A1 | 11/2015 | Cho |
| 2015/0346899 A1* | 12/2015 | Jung .................... G06F 3/0416 345/173 |
| 2016/0026316 A1 | 1/2016 | Choi et al. |
| 2016/0179328 A1* | 6/2016 | Yang .................... G06F 3/0488 715/863 |
| 2017/0115876 A1 | 4/2017 | Lee et al. |
| 2018/0081524 A1* | 3/2018 | Gao .................... G06F 1/1626 |

\* cited by examiner

ELECTRONIC DEVICE FOR VARIABLY DISPLAYING DISPLAY POSITION OF OBJECT ON EXPANSION AREA OF DISPLAY AND METHOD OF DISPLAYING

CROSS-REFERENCE TO RELATED APPLICATION

This application is based on and claims priority under 35 U.S.C. § 119 to a Korean patent application filed on Feb. 3, 2017 in the Korean Intellectual Property Office and assigned Serial number 10-2017-0015735, the disclosure of which is incorporated by reference herein in its entirety.

TECHNICAL FIELD

The present disclosure relates generally to a technology capable of varying the position of a side key of an electronic device.

BACKGROUND

An electronic device may include various user interfaces. For example, the electronic device may include at least one key provided on a side surface of a housing, in addition to a user interface of a front surface included together with a touch screen. The key provided on the side surface of the electronic device may be a key, such as a volume key, a power key, or the like, which is significantly frequently used by a user.

Recently, an electronic device has been disclosed with a display implemented in an edge type by expanding a front display to a portion of a side surface of the electronic device. Since a conventional electronic device in such a type may be designed such that a portion of the side surface of the display is bent to surround a side surface of a housing, the width of the side surface of the housing may be significantly reduced. Accordingly, in the conventional electronic device, a space may be insufficient to apply a physical side key to the side surface of the housing.

SUMMARY

Example aspects of the present disclosure address at least the above-mentioned problems and/or disadvantages and to provide at least the advantages described below. Accordingly, an example aspect of the present disclosure is to provide an electronic device for variably displaying a display position of a graphic object on an expansion area of a display and a method of displaying an object.

In accordance with an example aspect of the present disclosure, an electronic device may include a display including a front surface area and a side surface area disposed in at least one side of the front surface area, a first sensor included under the side surface area and configured to sense pressure applied to the side surface area; and a processor operatively connected with the display and the first sensor. The processor may be configured to determine a position of at least one point of the side surface area corresponding to the sensed pressure if the sensed pressure using the first sensor is within a first specified range, and to display at least one graphic object on an area corresponding to the determined position.

In accordance with another example aspect of the present disclosure, a method of displaying an object by an electronic device may include sensing pressure to a side surface area of a display using a sensor included under the side surface area, determining a position of at least one point of the side surface area corresponding to the sensed pressure, if the sensed pressure is within a first specified range, and displaying at least one graphic object on at least one area corresponding to the determined position of the at least one point.

As described above, according to various example embodiments, the graphic object (e.g., the virtual side key image) may be provided on the display area expanded from a front display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Hereinafter, various example embodiments of the present disclosure may be described with reference to accompanying drawings. Accordingly, those of ordinary skill in the art will recognize that modifications, equivalents, and/or alternatives of the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may refer, for example, to a device that is "capable of" operating together with another device or other components. For example, a "processor configured to (or adapted to) perform A, B, and C" may refer to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device FIG. 1A is a front view of an example electronic device, according to an example embodiment of the present disclosure, and FIG. 1B is a sectional view of the electronic device, according to an example embodiment of the present disclosure.

Figure 1A:
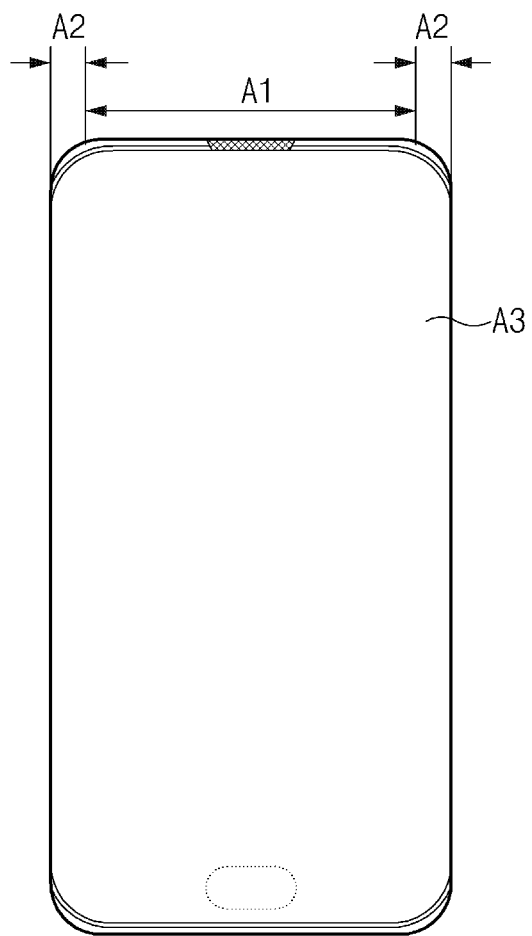
FIG. 1A is a front view of an example electronic device, according to an example embodiment of the present disclosure.
Figure 1B:
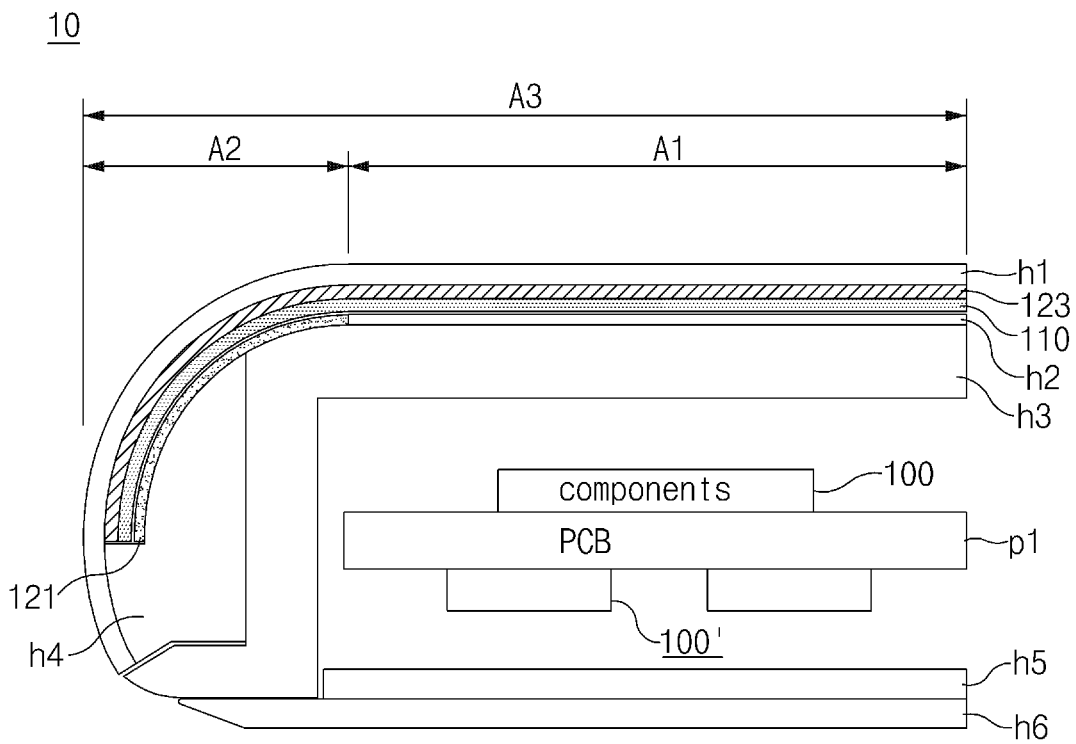
FIG. 1B is a sectional view of an example electronic device, according to an example embodiment of the present disclosure.

Referring to FIGS. 1A and 1B, according to an embodiment, an electronic device 10 may include a display 110. A whole display area A3 of the display may include a front surface area A1 and side surface areas A2. Various embodiments may provide a display function in various directions including not only a forward direction but also a side direction of the electronic device 10.

According to an embodiment, the front surface area A1 of the display may be a display area, which faces the forward direction of the electronic device 10, in the whole display area A3 of the electronic device 10 (or the display).

According to an embodiment, the side surface (edge) area A2 of the display, which is an area provided at one side or both sides of the front surface area A1, may be a display area, which faces the side direction of the electronic device 10, or a display area, which faces the forward direction and the side direction of the electronic device 10, in an entire display area A3. The side surface area A2 may include a display area facing a backward direction of the electronic device 10. The side surface area A2 may have a curved surface shape or a flat surface shape.

Referring to FIG. 1B, according to various embodiments, the electronic device 10 may include the display 110, a touch sensor electrode layer 123, a force sensor electrode layer 121, a circuit component 100, and housing members h1, h2, h3, h4, h5 and h6.

According to an embodiment, the circuit component 100 may include a processor (e.g., including processing circuitry) 150, a memory 130, a touch sensor integrated chip (IC), a force sensor IC, and other circuit components 100'. For example, the other circuit components 100' may include a printed circuit board P1, a processor (e.g., reference numeral 150 of FIG. 2A) and a memory (e.g., reference numeral 130 of FIG. 2A). The circuit components (com) will be described later with reference to FIGS. 2A and 2B.

According to an embodiment, the housing members h1 to h6 may form an outer appearance of the electronic device 10 and may fix the circuit components to relevant positions. For example, the housing members h1 to h6 may include a cover glass h1, a support member (dummy embo) h2, a metal bracket h3, a fixing member h4, a rear case h5, and a back cover h6.

According to an embodiment, the cover glass h1 and the metal bracket h3 may fix or support at least a portion (e.g., a touch panel) of a touch sensor 123 and the display 110. Components, such as the support member h2 and the fixing member h4, may be interposed between the cover glass h1 and the metal bracket h3 to support or fix the display 110, the touch sensor 123, the force sensor 121, and the like. In addition, the metal bracket h3 may form a portion of an outer surface of the electronic device 10.

According to an embodiment, a printed circuit board (PCB) (e.g., a memory, a processor, or the like) having the other circuit components 100' mounted on or accommodated in the PCB may be interposed between the metal bracket h3 and the rear case h5. The back cover h6 may be attached to an outer surface of the rear case h5. The back cover h6 may form an outer back surface of the electronic device 10. The back cover h6 may be formed of a polymer material or may be formed of metal or a ceramic material. Since the cover glass h1 is formed on a front outer surface of the electronic device 10, the electronic device 10 is formed to have a glass-type outer appearance by the cover glass h1 and the back cover h6.

The above-described configuration of the housing members h1 to h6 of the electronic device 10 is provided for an illustrative purpose of explaining the arrangement relation between the touch sensor 123 and the force sensor 121. The housing and the housing members h1 to h6 of the electronic device 10 according to an embodiment disclosed in the present disclosure may have various configurations.

Figure 2A:
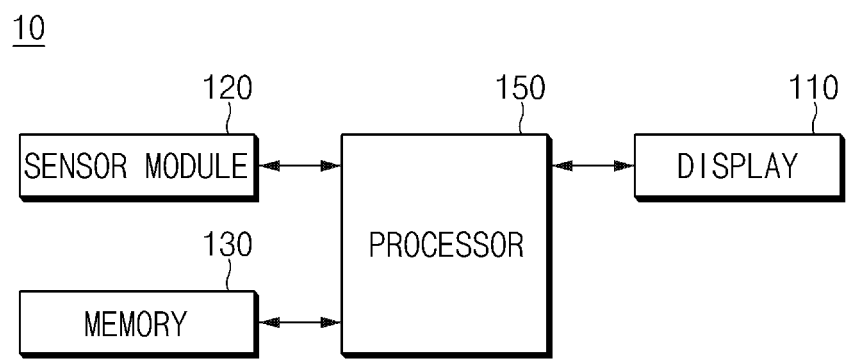
FIG. 2A is a block diagram illustrating an example electronic device, according to an example embodiment of the present disclosure.
Figure 2B:
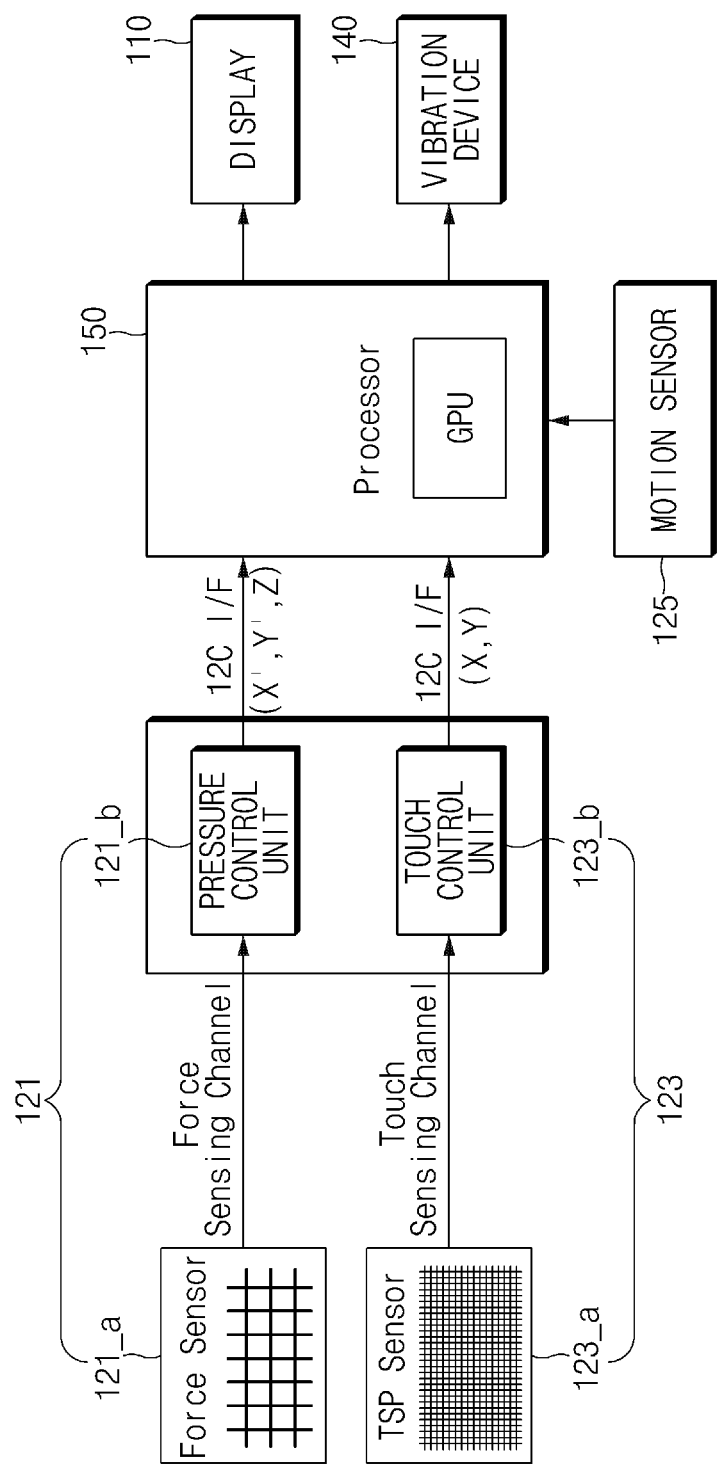
FIG. 2B is a block diagram illustrating an example electronic device, according to an example embodiment of the present disclosure.
Figure 2C:
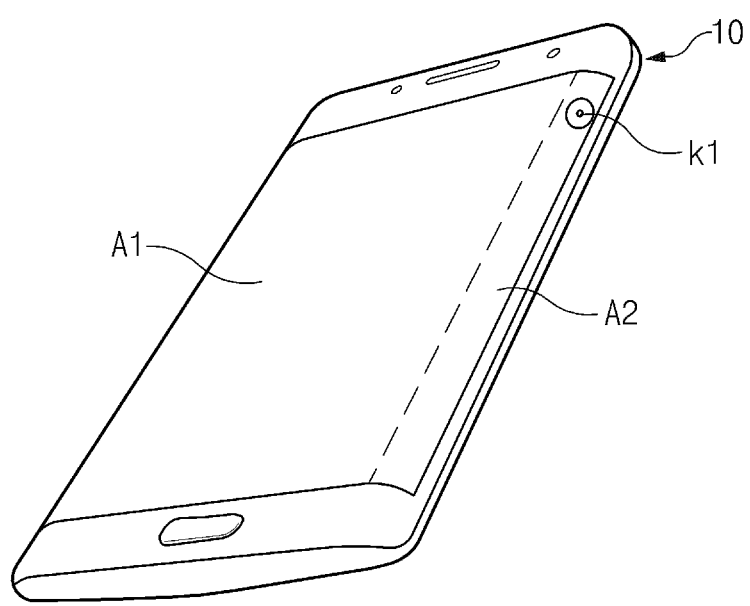
FIGS. 2C and 2D are diagrams illustrating example graphic objects, according to an example embodiment of the present disclosure.
Figure 2D:
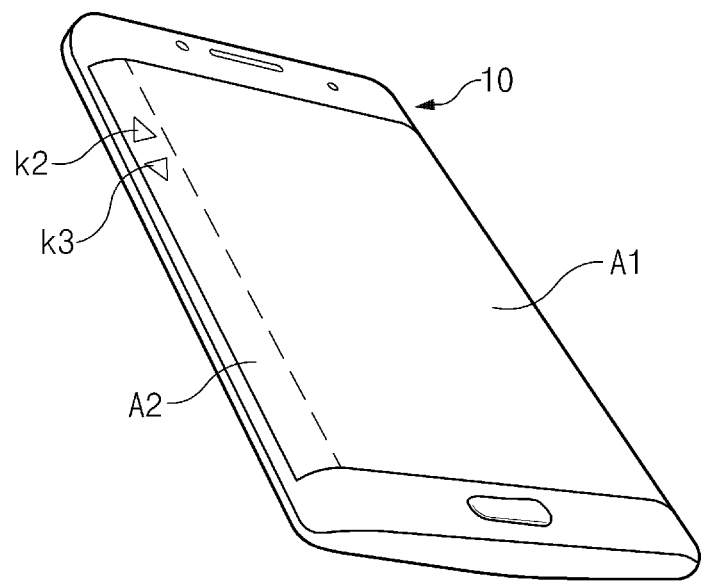
Figure 3A:
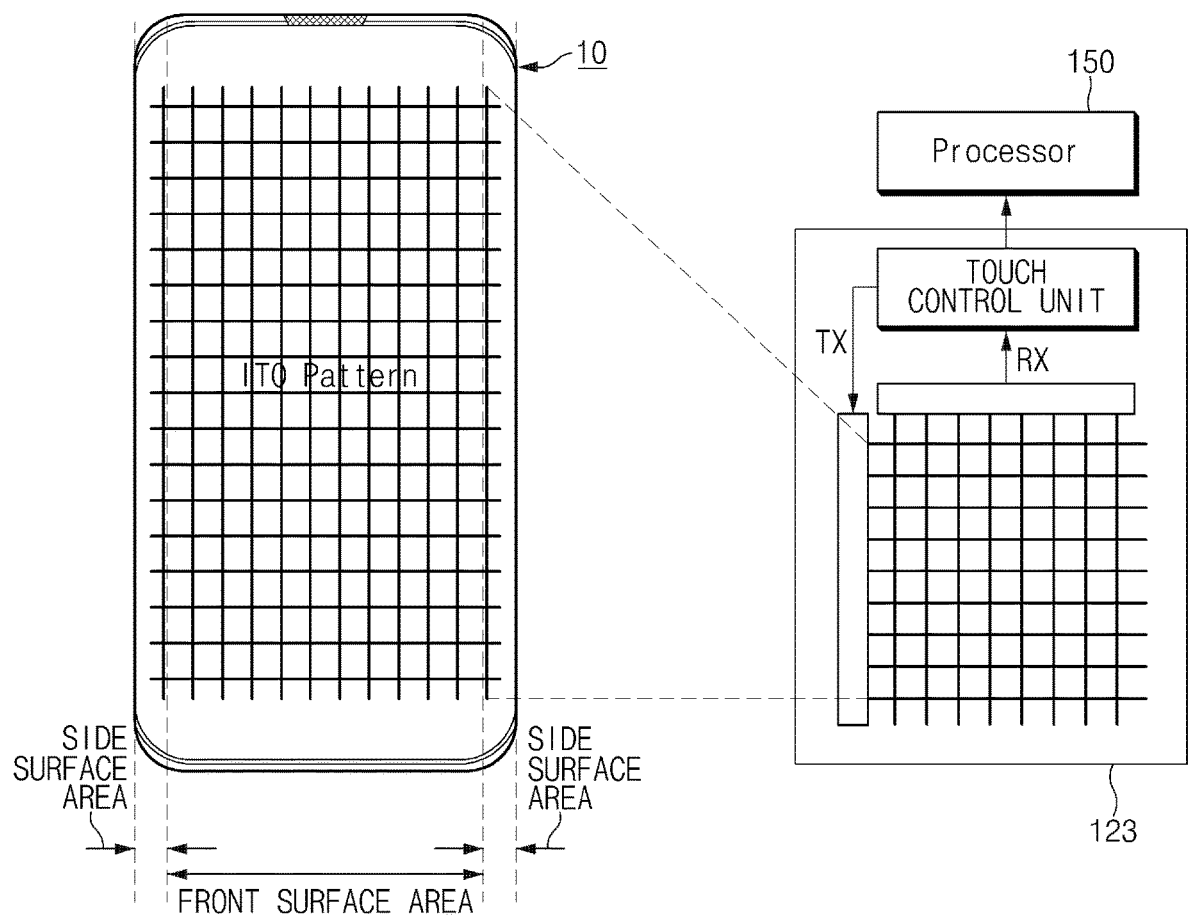
FIG. 3A is a diagrams illustrating an example touch sensing structure, according to an example embodiment of the present disclosure.
Figure 3B:
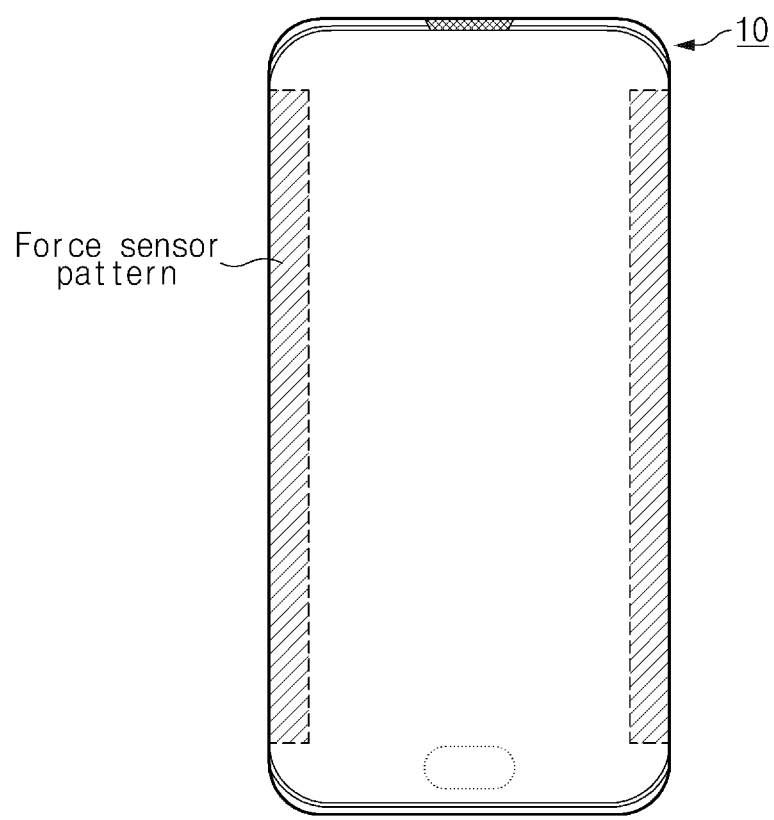
FIG. 3B is a diagram illustrating an example pressure sensing area, according to an example embodiment of the present disclosure.

FIG. 2A is a block diagram illustrating the electronic device, according to an example embodiment of the present disclosure, and FIG. 2B is a block diagram illustrating the electronic device, according to an example embodiment of the present disclosure. FIGS. 2C and 2D are diagrams illustrating example graphic objects, according to an example embodiment of the present disclosure. FIG. 3A is a diagram illustrating an example touch sensor, according to an example embodiment of the present disclosure, and FIG. 3B is a diagram illustrating an example pressure sensing area, according to an example embodiment of the present disclosure.

Referring to FIG. 2A, according to various embodiments, the electronic device 10 may include the display 110, a sensor module (e.g., including sensor circuitry) 120, the memory 130, and the processor (e.g., including processing circuitry) 150. According to an embodiment, some elements may be omitted or additional elements may be provided. For example, according to various embodiments, the electronic device 10 may include a vibration device 140 (see, e.g., FIG. 2B). In addition, according to an embodiment, some of the elements may be combined with each other to form one entity and the functions of the elements may be executed in the same manner as before the combination.

The display 110 may include, for example, and without limitation, a liquid crystal display (LCD), a light-emitting diode (LED) display, an organic LED (OLED) display, a microelectromechanical systems (MEMS) display, or an electronic paper display, or the like. The display 110 may display, for example, various contents (e.g., a text, an image, a video, an icon, a symbol, and/or the like) for a user.

According to an embodiment, as described above with reference to FIGS. 1A and 1B, the display 110 may include the side surface areas A2 and the front surface area A1. For example, the side surface area A2 may be disposed at both sides of the front surface area A1 or may be disposed at one side of the front surface area A1. According to an embodiment, the display 110 may display a graphic object on at least one of the front surface area A1 or the side surface area A2. Referring to FIGS. 2C and 2D, according to an embodiment, the graphic object may be a side key object displayed on the side surface area A2 of the display 110. For example, the graphic object may include at least one of a power key object k1, a volume up key object k2 or a volume down key object k3 as illustrated in FIG. 2C. Differently from a side key in a conventional mechanical structure, the display position of the graphic object according to an embodiment disclosed in the present disclosure may be varied depending on user inputs. The display position of the graphic object will be described below together with the processor 150.

According to an embodiment, the sensor module 120 may include various sensor circuitry, such as, for example, and without limitation, the touch sensor 123, the force sensor 121, and a motion sensor 125. The above sensors will be described in greater detail below with reference to FIGS. 3A and 3B.

Referring to FIG. 3A, according to an embodiment, the touch sensor 123 may include a touch panel 123_a and a touch control unit (e.g., including touch control circuitry) 123_b (see, e.g., FIG. 2B). The touch panel 123_a may be disposed or included above (or under) the side surface area A2 and the front surface area A1 of the display 110. The touch panel 123_a may be present separately from the display 110 and may be configured integrally with the display 110. The touch control unit 123_b may include various touch control circuitry and sense the variation in capacitance and touch coordinates corresponding to an approach, a touch, or a grip of a user to the touch panel 123_a based on a signal received from the touch panel 123_a.

According to an embodiment, the touch control unit 123_b may sense touch coordinates (x, y) of the user by distinguishing the side surface area A2 and the front surface area A1. According to an embodiment, the touch control unit 123_b may control at least one of a portion of the touch panel 123_a disposed in the side surface area A2 or the front surface area A1 in terms of a sensing period, a sensitivity, and an activation/deactivation state. According to an embodiment, the touch control unit 123_b may communicate with the processor 150 through, for example, an I2C interface.

According to an embodiment, the force sensor 121 may be included under the side surface area A2 of the display 110. The force sensor 121 may calculate the pressure to the side surface area A2 and a sensing position (x', y', and z) to the side surface area A2. According to an embodiment, the force sensor 121 may communicate with the processor 150 through, for example, an I2C interface.

As illustrated in FIG. 3B, in the case that the side surface areas A2 of the display 110 are included in both sides of the electronic device 10, force sensors 121 are positioned at both sides of the electronic device 10. In this case, a force sensor pattern for pressure sensing may be positioned at an area other than the top or the bottom of the electronic device 10 in which a main antenna or a sub-antenna is present. When a user manipulates a side key, the user grips the central portion of the electronic device 10. Therefore, according to an embodiment, the force sensor 121 may rarely affect antenna performance in an antenna area and may provide the convenience for the user in manipulating the side key.

According to another embodiment, the force sensor 121 may be included throughout the whole area under the display 110 depending on the form in which the display 110 is implemented. In this case, the processor 150 may be configured to distinguish the front surface area A1 of the display 110 and the side surface areas A2 of the display 110.

According to an embodiment, the motion sensor 125 may sense the motion of the electronic device 10. For example, the motion sensor 125 may be at least one of an acceleration sensor or a terrestrial magnetism sensor, or the like, but is not limited thereto. In the present disclosure, an example that the motion sensor 125 is the acceleration sensor will be described.

Referring back to FIG. 2A, the memory 130 may be a volatile memory (e.g., a random access memory (RAM), or the like), a non-volatile memory (e.g., a read-only memory (ROM), a flash memory, or the like), or any combination thereof. For example, the memory 130 may store instructions or data associated with at least one of other element(s) of the electronic device 10. According to an embodiment, the memory 130 may store an instruction for sensing an approach of a user to the display 110 and a user input into the display 110, for displaying a graphic object on the display 110, and for executing a function corresponding to the graphic object. As described above, the graphic object may include a side key image to be displayed on the side surface area A2 of the display 110. Although the graphic object is displayed on even the front surface area A1 of the display 110, the following description will be made regarding the example that the graphic object is a side key image.

For example, the processor 150 may include, for example, and without limitation, at least one of a dedicated processor, a central processing unit (CPU), an application processor (AP), a graphics processing unit (GPU), a micro-processor, an application specific integrated circuits (ASIC), or a field programmable gate array (FPGA), or may have a plurality of cores, or the like. The processor 150 may perform an arithmetic operation or data processing associated with control and/or communication of at least other elements of the electronic device 10.

According to an embodiment, the processor 150 may sense the approach of the user to the electronic device 10 or the display 110 using the touch sensor 123. For example, if the capacitance sensed by the touch sensor 123 due to the approach of the user is equal to or greater than a first threshold capacitance, the processor 150 may determine the user to be in an approach state to the electronic device 10. To this end, the processor 150 may continuously activate the touch sensor (e.g., a touch panel at the side surface area) to sense the touch to the side surface area A2. The details thereof will be described later with reference to FIGS. 4A to 4C.

According to an embodiment, if sensing the approach of the user, the processor 150 may activate a component which is used to sense a user input. For example, a first component, which is used to sense a user input, may include a force sensor 121, which senses pressure applied to the side surface area A2, and the motion sensor 125 which senses the acceleration of the electronic device 10. As described above, according to an embodiment, before the approach of the user to the display 110, a component, which senses a user input used to determine the display state of the graphic object, may be deactivated (e.g., in an off state, a sleep state, or the like). Accordingly, the power consumption of the sensor module 120 may be reduced. Alternatively, if sensing a grip of the user after sensing the approach of the user, the processor 150 may activate the first component used to sense the user input.

According to an embodiment, the processor 150 may sense the grip of the user on the display 110 after sensing the approach of the user. For example, the processor 150 may sense the grip of the user as the processor 150 senses the variation in the capacitance at both sides of the display 110 depending on the grip of the user. For example, the processor 150 may determine whether the capacitance sensed by the touch sensor 123 belongs to a specified capacitance range to distinguish between the grip (or a touch) of the user and a touch by another component, for example, a holder of the electronic device 10.

According to an embodiment, the processor 150 may sense a first user input into the side surface area A2 using the force sensor 121 in a grip state of the user. For example, the processor 150 may determine the first user input to occur if pressure sensed during the grip of the user belongs to a first specified range. The first specified range may be, for example, a pressure range of first threshold pressure or more. The first threshold pressure may be determined by an experiment of detecting a pressure value corresponding to the user input.

According to an embodiment, the processor 150 may determine a position of at least one position on which the graphic object is to be displayed, if sensing the first user input. For example, the processor 150 may determine, as display positions of the graphic object, a position of the side surface area A2, in which the first user input is sensed, and a position of at least a portion of the front surface area A1 in the proximity of the sensed position. Therefore, according to an embodiment, as the graphic object is displayed on the side surface area A2 and the front surface area A1 of the display 110, the graphic object may be prevented from being hidden due to the grip of the user.

According to an embodiment, if sensing the first user input, the processor 150 may determine whether the sensed first user input is a valid user input. The valid user input may be a user input made when the user holds the electronic device 10 at a specific angle to view the display 110. For example, the processor 150 may determine the validity of the first user input using the motion sensor 125 if sensing pressure belonging to the first specified range during the grip of the user. In detail, the processor 150 may determine the variation in the acceleration of the electronic device 10 by using the motion sensor 125 (e.g., an acceleration sensor) and may determine the variation in the angle of the electronic device 10 based on the variation in the acceleration of the electronic device 10. If recognizing the electronic device 10 as being held at the specific angle, the processor 150 may determine the first user input to be the valid user input. Therefore, according to an embodiment, the state of the user moving while viewing the display 110 (using the electronic device 10) may be distinguished from the state of the user carrying the electronic device 10 without using the electronic device 10.

According to an embodiment, the processor 150 may sense a left hand grip state of the user and a right hand grip state of the user using the touch sensor 123. The processor 150 may differently determine the position of the at least one point in the left hand grip state of the user and the right hand grip state of the user. For example, the processor 150 may determine the position of a power key object to be at a left side in which the thumb of the user is positioned and may determine the position of a volume up/down key object to be at a right side in which fingers of the user other than the thumb of the user are positioned, in the left hand grip state of the user. For example, the processor 150 may determine the position of the power key object to be at the right side in which the thumb of the user is positioned and may determine the position of the volume up/down key object to be at the left side in which the fingers of the user other than the thumb of the user are positioned, in the right hand grip state of the user. As described above, according to an embodiment, the graphic object may be displayed at a position at which both of a left-handed user and a right-handed user are able to easily manipulate the graphic object.

According to an embodiment, if sensing a second user input in one of positions of at least one graphic object, the processor 150 may execute a first function corresponding to the graphic object. For example, the processor 150 may determine the second user input to occur if pressure belongs to the second specified range is sensed in a position of one graphic object by using the force sensor 121. The second specified range may be a pressure range of second threshold pressure or more (>first threshold pressure). The second threshold pressure may be determined by an experiment of detecting a pressure value corresponding to the user input. As described above, according to an embodiment, as the first threshold pressure is distinguished from the second threshold pressure, the processor 150 may distinguish between the state, in which a user holds the electronic device 10 while viewing the display 110, and the state in which the user manipulates a side key.

According to an embodiment, the processor 150 may continuously display a graphic object on the side surface area A2 until a first specified condition is satisfied after displaying the graphic object. For example, the first specified condition may refer to that touches of a user are released from all touch areas of the display 110. Therefore, according to an embodiment, the user may release the touch to one of touch areas and then touch to the touch area again to manipulate one of a plurality of graphic objects. In this case, since remaining touch areas are maintained in a touch state, the processor 150 may continuously display the graphic object.

According to an embodiment, the processor 150 may display the graphic object and may erase the graphic object displayed on the side surface area A2 if the first specified condition is satisfied. The processor 150 may initialize the determined position of the at least one point if the graphic object is erased from the side surface area A2. As described above, according to an embodiment, the position of the graphic object may be changed depending on the touch area of the user. Accordingly, the graphic object may be displayed at a position that the user is easily able to manipulate the graphic object.

According to an embodiment, when displaying the graphic object or executing a function corresponding to the graphic object, the processor 150 may provide a haptic feedback for the user using the vibration device 140. For example, when the user grips the electronic device 10, the processor 150 may generate vibration corresponding to the graphic object by using the vibration device 140 to provide a touch feel of a real physical key for the user.

According to an embodiment, in the case of displaying the graphic object as the user approaches or grips the electronic device 10, the processor 150 may vibrate the vibration device 140 at a first frequency to provide a touch feel of a real key for the user. When executing a function corresponding to the graphic object, the processor 150 may vibrate the vibration device 140 at a second frequency to provide a click feel of a real key.

According to an embodiment, the processor 150 may determine the position of the at least one point to be the same position in both of the left hand grip of the user and the right hand grip of the user. In detail, the processor 150 may determine the position of the at least one point to be the same position in both of the left hand grip of the user and the right hand grip of the user if first settings is made through the sensor module 120. The first settings may be, for example, made through the manipulation of a first menu for setting the position of the at least one point to the same position regardless of the type of hands (e.g., a left hand or a right hand) which grip the electronic device 10. According to an embodiment, the processor 150 may determine whether to make the first settings by determining the manipulation state of the first menu based on touch coordinates of at least one of the front surface area A1 or the side surface area A2.

According to an embodiment, the processor 150 may fix the position of the graphic object without changing the position of the graphic object if making second settings through the sensor module 120. The second settings may be made through the manipulation of a second menu for fixing the position of the graphic object regardless of the position in which the user input is sensed.

According to an embodiment, the processor 150 may determine whether to make the second settings by determining the manipulation state of a functional menu based on the coordinates of a touch of the user to at least one of the front surface area A1 or the side surface area A2. Therefore, according to an embodiment, a curved surface may be seamlessly designed in the electronic device 10 having the display structure, and a side key object may be intuitively and intelligently provided for the user.

According to an embodiment, the processor 150 may differently control the sensitivity to a touch panel (hereinafter, referred to as "first touch panel"), which is provided above (or under) the front surface area A1, and the sensitivity to a touch panel (hereinafter, referred to as "second touch panel"), which is provided above (or under) the side surface area A2, through the touch control unit 123_b. To this end, the touch control unit 123_b may be configured to differently control the sensitivity of the first touch panel and the sensitivity of the second touch panel. Hereinafter, the details thereof will be described with reference to FIGS. 4A to 4C.

Figure 4A:
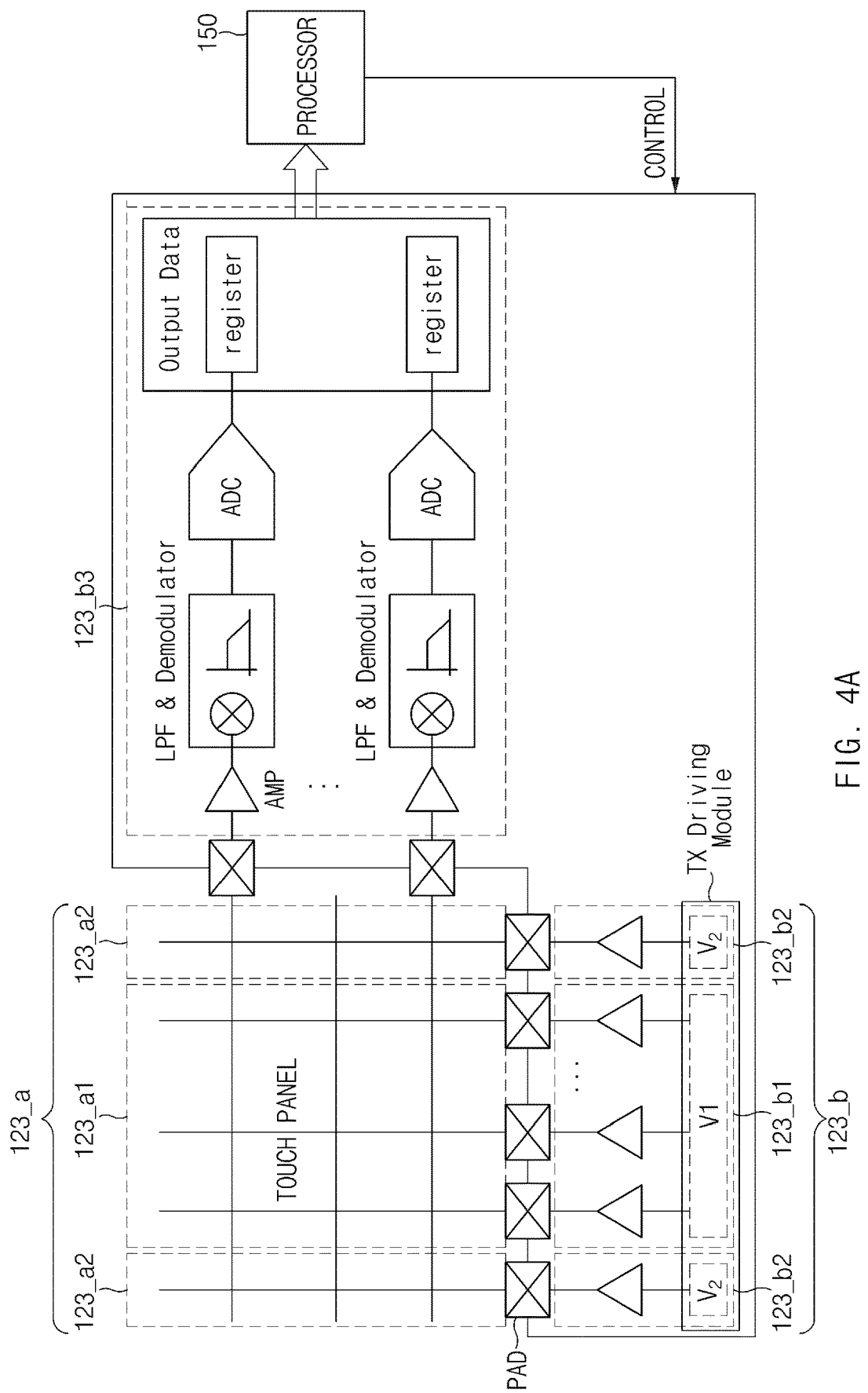
FIG. 4A is a circuit diagram illustrating an example touch sensor, according to an example embodiment of the present disclosure.
Figure 4B:
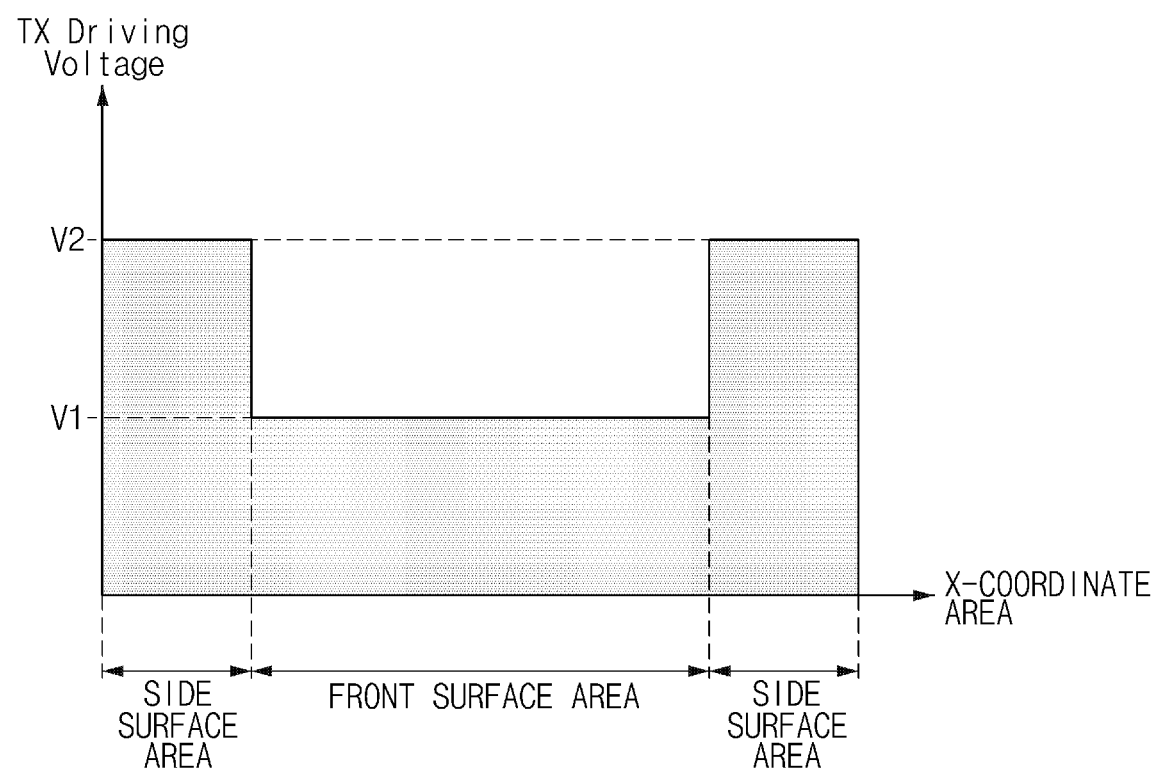
FIG. 4B is a graph illustrating sensing driving signal strength in each area of the touch sensor, according to an example embodiment of the present disclosure.
Figure 4C:
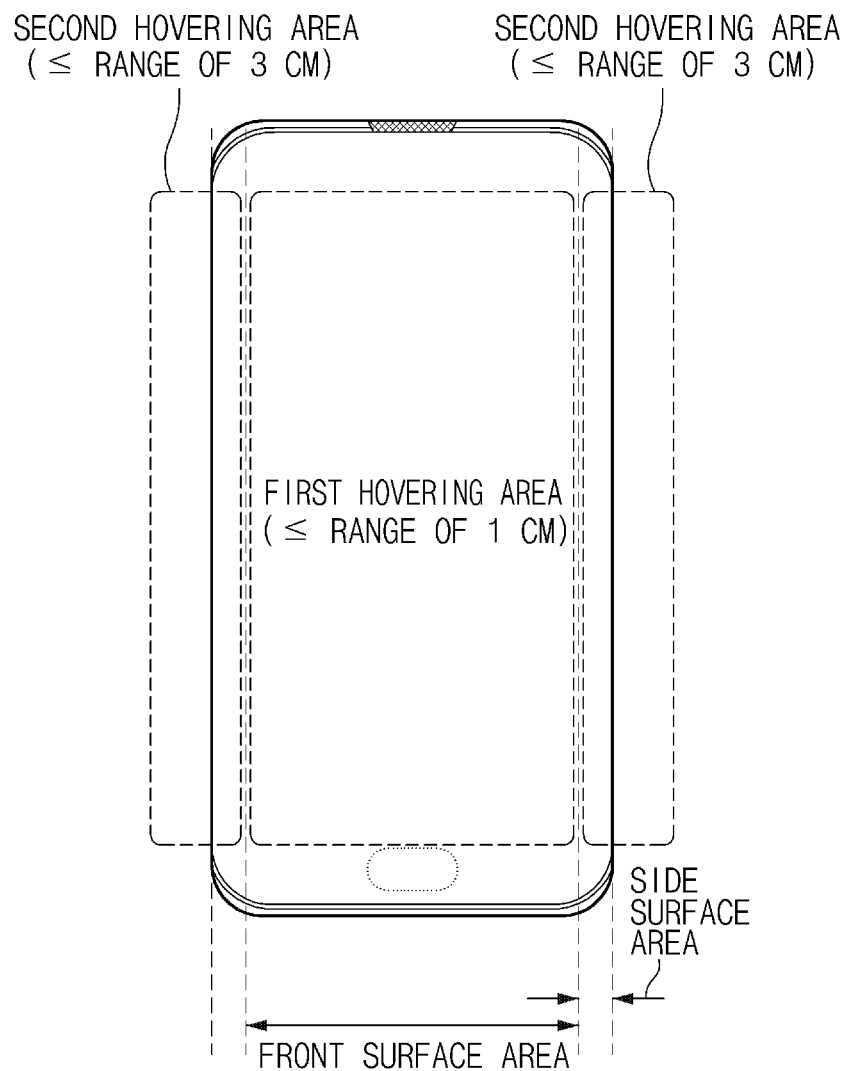
FIG. 4C is a diagram illustrating an example hovering area of an electronic device, according to an example embodiment of the present disclosure.

FIG. 4A is a circuit diagram illustrating an example touch sensor, according to an example embodiment of the present disclosure, and FIG. 4B is a graph illustrating example driving signal strength sensed in each area of the touch sensor, according to an example embodiment of the present disclosure. FIG. 4C is a diagram illustrating an example hovering area of the electronic device, according to an example embodiment of the present disclosure.

Referring to FIG. 4A, the touch control unit 123_b may include a first transmission block 123_b1, a second transmission block 123_b2, and a plurality of reception blocks 123_b3. According to an embodiment, the first transmission block 123_b1 may be a block which transmits a signal to a first touch panel 123_a1 included above (or under) the front surface area A1. The second transmission block 12_b2 may be a block which transmits a signal to a second touch panel 123_a2 included above (or under) the side surface area A2. A plurality of first transmission block 123_b1 may be provided. For example, the first transmission blocks 123_b1 may include a transmission block, which is provided in the side surface area A2 at a right side of the electronic device 10, and a transmission block which is provided in the side surface area A2 at a left side of the electronic device 10. According to an embodiment, the reception blocks 123_b3 may include at least one amplifier AMP, a low-pass filter LPF, a demodulator, an analog-digital modulator (ADC), and an output register. Each reception block 123_b3 may receive an analog signal corresponding to capacitance from each row of the touch panel 123_a connected to the reception block 123_b3 and may convert and output the analog signal to digital coordinates. Since those skilled in the art may obviously derive the configuration of the reception block 123_b3 from the configuration of the touch sensor 123, the details thereof will be omitted.

Referring to FIG. 4A, according to an embodiment, the processor 150 may differently control the first touch panel 123_a1, which is provided above (or under) the front surface area A1, and the second touch panel 123_a2, which is provided above (or under) the side surface area A2, in terms of at least one of a signal sensitivity or activation/deactivation.

For example, as illustrated in FIG. 4B, the touch control unit 123_b may adjust the transmit power of the first touch panel 123_a1 to V1 and adjust the transmit power of the second touch panel 123_a2 to V2 (>V1). Referring to FIG. 4C, the strength of the transmit power V1 of the first touch panel 123_a1 may be set to strength sufficient to cover the range of a first hovering area. For example, the strength of the transmit power V1 of the first touch panel 123_a1 may be set to strength sufficient to sense the approach of the user at a distance (first hovering area) of, for example, 1 cm or less from the front surface area A1, but is not limited thereto. The strength of the transmit power V2 of the second touch panel 123_a2 may be set to strength sufficient to cover the range of a second hovering area. For example, the strength of the transmit power V2 of the second touch panel 123_a2 may be set to strength sufficient to sense the approach of the user at a distance (second hovering area) of, for example, 3 cm or less from the side surface area A2, but is not limited thereto.

For another example, the processor 150 may set a signal transmission period for the second touch panel 123_a2 to a first period if failing to sense the approach of the user using the second touch panel 123_a2 (or before sensing the approach of the user by using the second touch panel 123_a2). After sensing the approach of the user, the processor 150 may set a signal transmission period for the second touch panel 123_a2 to a second period (>the first period)

For another example, the processor 150 may deactivate the first transmission block 123_b1, which transmits a signal to the first touch panel 123_a1) if failing to sense the approach of the user by using the second touch panel 123_a2. After sensing the approach of the user using the second touch panel 123_a2, the processor 150 may activate the first transmission block 123_b1. As described above, according to an embodiment, the approach of the user may be easily sensed, and the power consumption for sensing the touch of the user may be reduced.

The description has been made with reference to FIGS. 4A to 4C for the illustrative purpose regarding the case that one touch control unit 123_b controls the transmit sensitivity (e.g., a transmission period, activation/deactivation, or transmit power) of the first touch panel 123_a1 and the second touch panel 123_a2. Alternatively, the touch sensor 123 may include a plurality of touch sensors. For example, the touch sensor 123 may include a first touch sensor including the first touch panel 123_a1 and the first touch control unit (not illustrated) and a second touch sensor including the second touch panel 123_a2 and the second touch control unit 123_b.

Figure 5:
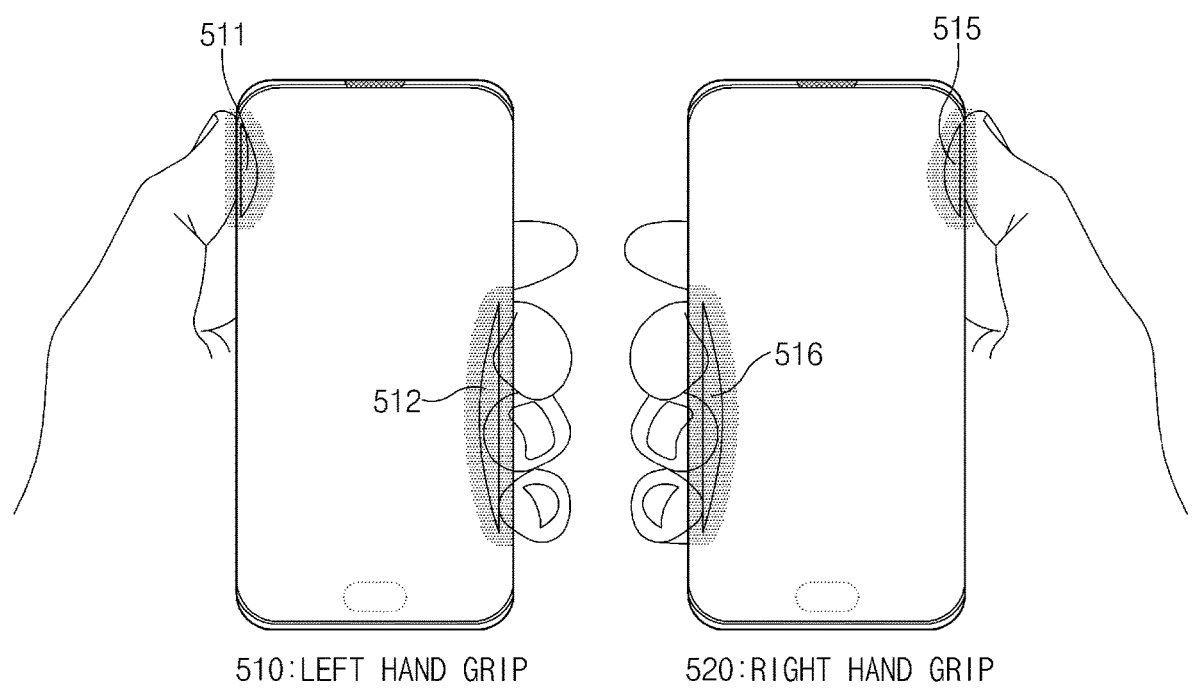
FIG. 5 is a diagram illustrating an example manner of determining a position of a graphic object depending on a left hand/right hand grip of a user, according to an example embodiment of the present disclosure.

FIG. 5 is a diagram illustrating an example manner of determining a position of a graphic object depending on a left hand/right hand grip of a user, according to an example embodiment of the present disclosure.

Referring to FIG. 5, as illustrated in state 510, in the case that a user grips the electronic device 10 with a left hand, the thumb of the user may touch a first touch area 511 positioned at an upper left portion of the display 110, and remaining fingers of the user other than the thumb may touch a second touch area 512 positioned at a lower right portion of the display 110. According to an embodiment, the processor 150 may determine the position of a power key object based on the first touch area 511 positioned at the upper left portion of the display 110 and determine the position of a volume control key object based on the second touch area 512 positioned at the lower right portion of the display 110, in state 510. According to an embodiment, the processor 150 may determine the position of the at least one point by taking into consideration the positions of the fingers of the user on the second touch area 512 on which the volume control key object is displayed. For example, in the case that the first user input is sensed in a plurality of positions of the second touch area 512, the processor 150 may determine two upper positions among the plurality of positions to be positions of a plurality of points on which the volume control key object is to be displayed.

As illustrated in state 520, in the case that the user grips the electronic device 10 with a right hand, the thumb of the user may touch a fifth touch area 515 positioned at an upper right portion of the display 110, and remaining fingers of the user other than the thumb may touch a sixth touch area 516 positioned at a lower left portion of the display 110. According to an embodiment, the processor 150 may determine the position of a power key object based on the fifth touch area 515 positioned at the upper right portion of the display 110 and determine the position of a volume control key object based on the sixth touch area 516 positioned at the lower left portion of the display 110, in state 520. As described above, according to an embodiment, the graphic object may be displayed on a position in which the user is able to more easily manipulate (touch) the graphic object.

Figure 6:
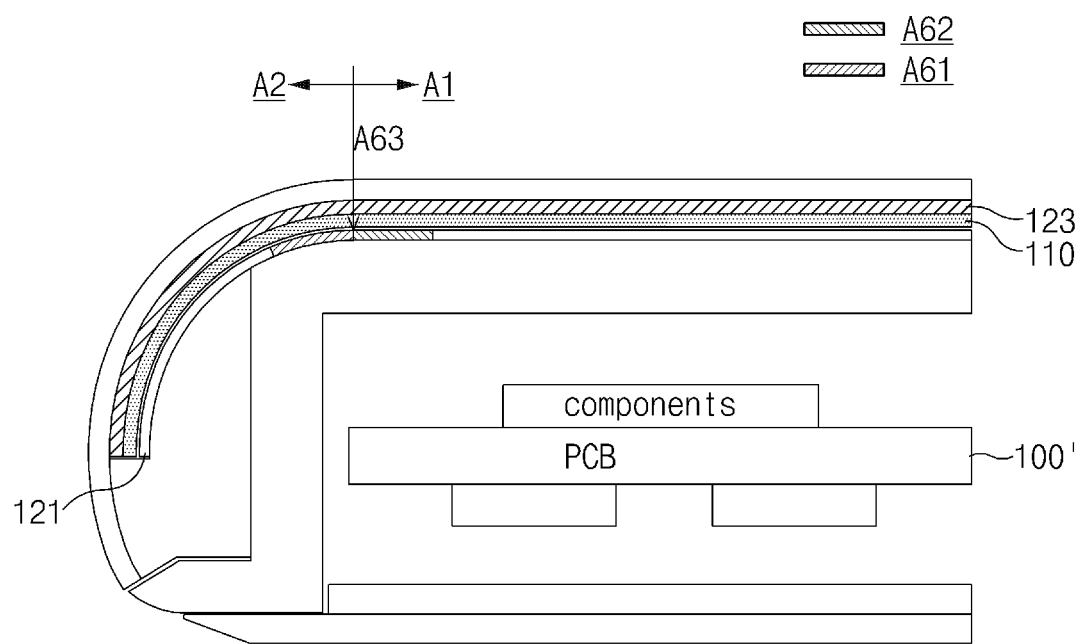
FIG. 6 is a sectional view illustrating an example display position of a graphic object, according to an example embodiment of the present disclosure.

FIG. 6 is a diagram illustrating an example display position of a graphic object, according to an example embodiment of the present disclosure.

Referring to FIG. 6, according to an embodiment, the processor 150 may determine the position of the at least one point on which the graphic object is to be displayed based on at least one of the touch area touched by the user or the sensing position of the first user input. For example, the processor 150 may determine the display position of the graphic object to include at least portions of a first position A61 of the side surface area A2, at which the first user input is detected, and a second position A62 of the front surface area A1, which is in the proximity of the first position A61 and has a specified area. The specified area may be set to an area corresponding to the first position A61. For another example, the processor 150 may determine a position A63 of one side of the front surface area A1, which is in the proximity of the first position A61 of the side surface area A2, to be the position of the at least one point.

According to an embodiment, as a graphic object (virtual side key object) is displayed while crossing the side surface area A2 and the front surface area A1 of the display 110, the graphic object may be prevented from being hidden due to the grip by the user.

Figure 7:
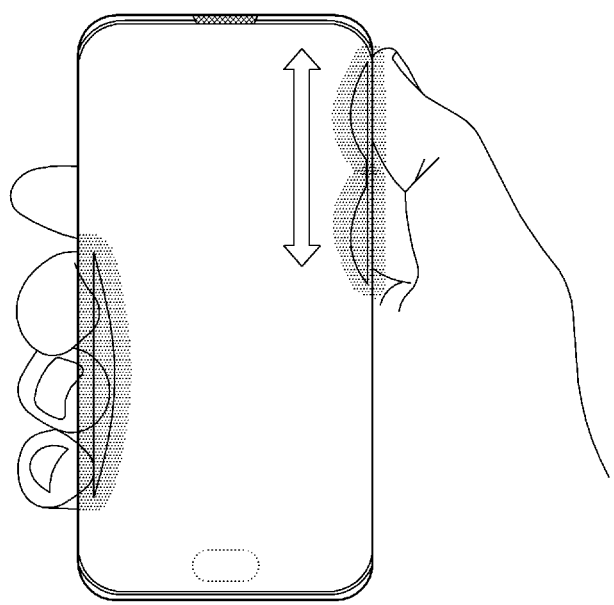
FIG. 7 is a diagram illustrating an example manner of manipulating a graphic object, according to an example embodiment of the present disclosure.

FIG. 7 is a diagram illustrating an example manner of manipulating a graphic object, according to an example embodiment of the present disclosure.

Referring to FIG. 7, according to another embodiment, after sensing a second user input in the state that two graphic objects are displayed on one side of the display 110, the processor 150 may determine a graphic object, which is selected from two graphic objects, based on a sliding direction of a user at a right side of the display 110. For example, if the hand of the user moves (slides) downward in the state that the touch by the hand of the user is not released from one side of the display 110 displaying two graphic objects, the processor 150 may determine an upper graphic object to be selected from two graphic objects. In this case, the processor 150 may repeatedly execute a first function by the number of times of sliding downward while ignoring sliding upward until the second user input is detected again. The processor 150 may determine whether to change the sliding direction, if sensing a second user input while sensing sliding downward. Thereafter, if the user slides upward, the processor 150 may determine a lower graphic object to be selected and may repeatedly execute a second function corresponding to the lower graphic object by the number of times of sliding upward.

Figure 8:
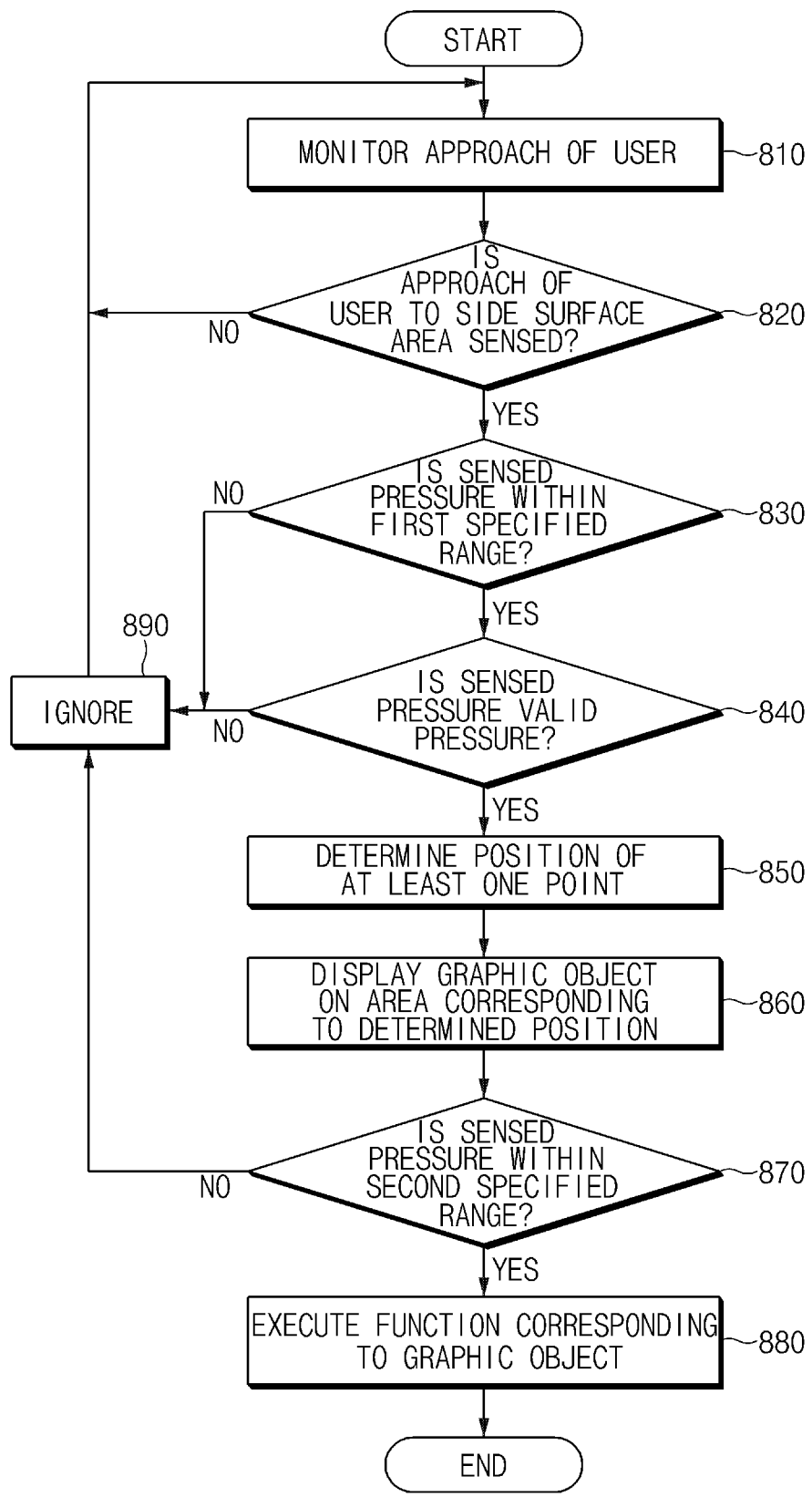
FIG. 8 is a flowchart illustrating an example method of displaying a graphic object, according to an example embodiment of the present disclosure.

FIG. 8 is a flowchart illustrating an example method of displaying the graphic object (a side key object), according to an example embodiment of the present disclosure.

Referring to FIG. 8, the processor 150 may monitor the approach (hovering) of the user to the side surface area A2 of the display, in operation 810. For example, the processor 150 may monitor the approach state of the user by sensing the variation in capacitance using the second touch panel 123_a2 included in an upper portion (or a lower portion) of the side surface area A2. The processor 150 may determine the user to approach the side surface area A2 of the display, if sensing at least a capacitance specified for the approach of the user to the side surface area A2.

If sensing the approach of the user to the side surface area A2 in operation 820, the processor 150 may increase the sensitivity of the second touch panel 123_a2 included above (or under) the side surface area A2. For example, the processor 150 may reduce the sensing period of the second touch panel 123_a2. If sensing the approach of the user to the side surface area A2 in operation 820, the processor 150 may activate the force sensor 121 and the motion sensor 125.

The processor 150 may sense pressure using the force sensor 121 and determine whether the sensed pressure is within the first specified range, in operation 830. The first specified range may be, for example, a pressure range of the first threshold pressure or more. If the sensed pressure is not determined to belong to the first specified range, the processor 150 may ignore the sensed pressure in operation 890.

If the sensed pressure is determined to belong to the first specified range, the processor 150 may determine whether the sensed pressure is a valid pressure, by using the motion sensor 125, in operation 840. For example, the processor 150 may determine the variation in the acceleration of the display 110 by using the motion sensor 125 and may determine, based on the variation in the acceleration of the display 110, whether the display 110 is maintained at a specific angle. If determining the display 110 to be maintained at the specific angle, the processor 150 may determine the sensed pressure to be the valid pressure. Meanwhile, if the failing to determine the sensed pressure to be the valid pressure, the processor 150 may ignore the sensed pressure in operation 890.

If the processor 150 determines the sensed pressure to be a valid pressure, the processor 150 may determine the position of the at least one point in operation 850. According to an embodiment, the processor 150 may determine, based on the sensed touch area, whether the grip state of the user is a right hand grip state or a left hand grip state and may differently determine the position of the at least a point in the right hand grip state and in the left hand grip state.

The processor 150 may display at least one graphic object (e.g., a side key object) on the determined position in the side surface area A2 of the display 110 in operation 860. The processor 150 may prepare for a graphic object, which is to be displayed, in operation 820 to operation 860. According to an embodiment, the processor 150 may differently display the graphic object in the right hand grip state and the left hand grip state.

The processor 150 may determine whether pressure within the second specified range is sensed to one of graphic objects in operation 870. The second specified range may be, for example, a pressure range of the second threshold pressure (>the first threshold pressure) or more.

If the pressure belonging to the second specified range is sensed to one of graphic objects, the processor 150 may execute a function corresponding to the graphic object to, which the pressure belonging to the second specified range is sensed, in operation 880.

Figure 9:
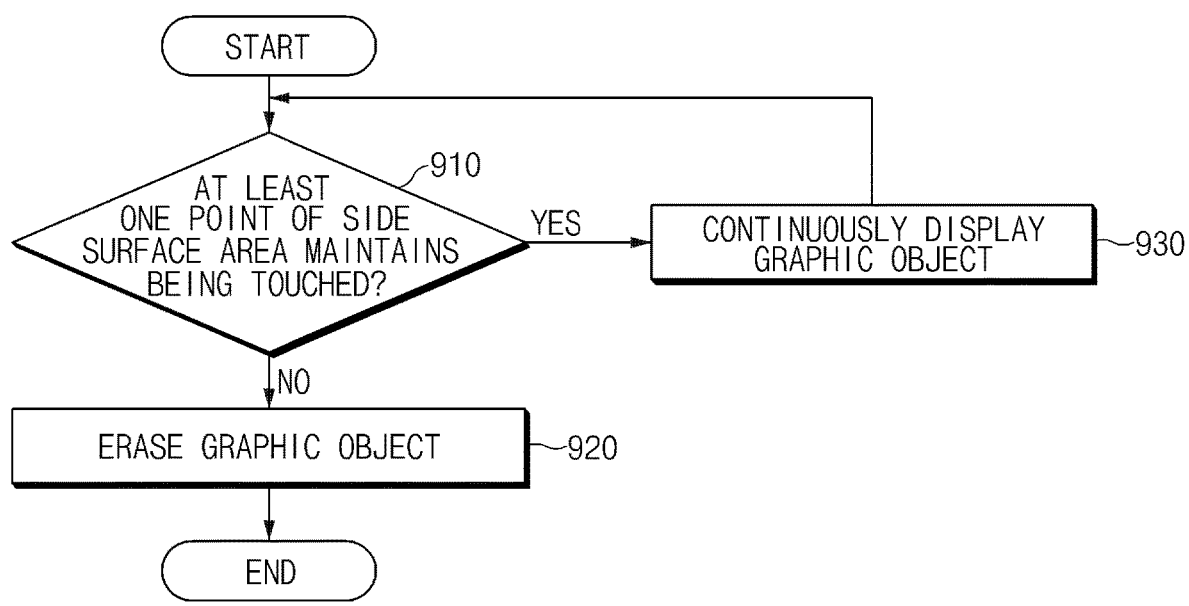
FIG. 9 is a flowchart illustrating an example manner of initializing a graphic object, according to an example embodiment of the present disclosure.

The processor 150 may determine whether to initialize the determined position and to erase the displayed graphic object as illustrated in FIG. 9, in the state that the graphic object is displayed on the display 110, in operation 830 to operation 880. As described above, according to an embodiment, a side key object may be provided to a position of the side surface area A2 of the display 110 corresponding to the position of the hand of the user.

FIG. 9 is a flowchart illustrating an example manner of initializing the graphic object, according to an example embodiment of the present disclosure.

The processor 150 may determine whether the touch of the user to at least one point of the side surface area A2 is maintained using the touch sensor 123 in the state that the graphic object is displayed, in operation 910.

If the touch to the side surface area A2 is released, the processor 150 may erase the displayed graphic object in operation 920. The processor 150 may initialize the determined position of the at least one point in operation 920. As described above, according to an embodiment, the side key object may be fluidly or variably displayed.

If determining that the touch to the at least one point of the side surface area A2 is maintained, the processor 150 may continuously display the graphic object in operation 930. For example, the user may release the touch to one of touch areas of the display 110 and then touch to the touch area again to manipulate one of a plurality of graphic objects. In this case, since a touch to any one of the touch areas is maintained, the processor 150 may continuously display the graphic object.

Figure 10:
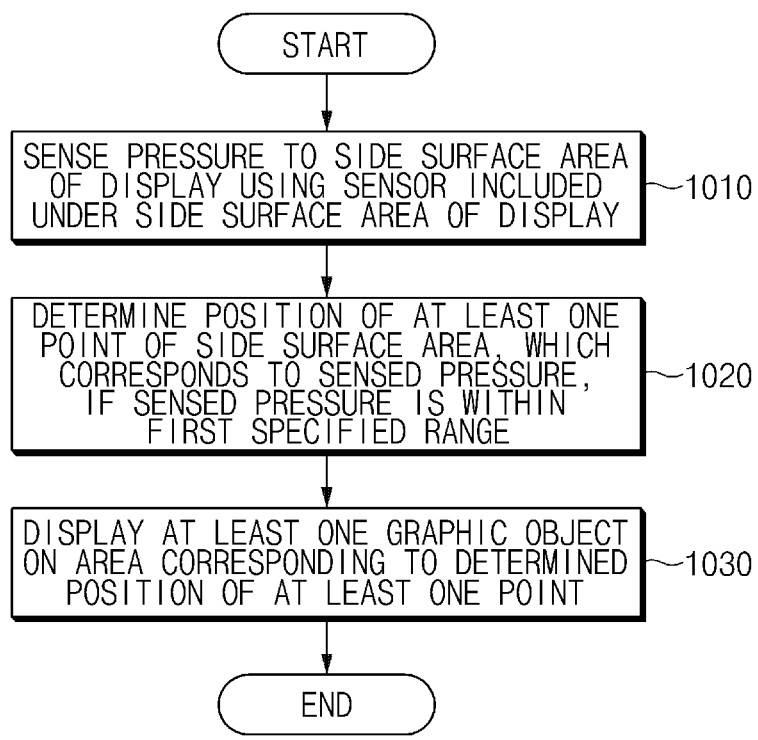
FIG. 10 is a flowchart illustrating an example method of displaying an object, according to an example embodiment of the present disclosure.

FIG. 10 is a flowchart illustrating an example method of displaying an object, according to an example embodiment of the present disclosure.

A processor (e.g., 150 of FIG. 2) may sense pressure to a side surface area of a display using a sensor included under the side surface area of the display, in operation 1010.

The processor 150 may determine whether the sensed pressure is within a first specified range, in operation 1020.

The processor 150 may determine a position of at least one point of the side surface area if the sensed pressure belongs to the first specified range, in operation 1020. The processor 150 may display at least one graphic object on an area corresponding to the determined position of the at least one point in operation 1030.

According to an example embodiment, an electronic device includes a display including a front surface area and a side surface area disposed in at least one side of the front surface area; a first sensor included under the side surface area and configured to sense pressure applied to the side surface area; and a processor operatively connected with the display and the first sensor, wherein the processor is configured to determine a position of at least one point of the side surface area corresponding to a sensed pressure, if the sensed pressure using the first sensor is within a first specified range; and the processor is further configured to cause the electronic device to display at least one graphic object on an area corresponding to the determined position.

The electronic device further includes a second sensor configured to sense a grip on the display, wherein the processor is configured to sense a left hand grip and/or a right hand grip using the second sensor; and the processor is further configured to differently determine the position of the at least one point based on sensing the left hand grip and the right hand grip.

The electronic device further includes a second sensor configured to sense a touch to the display, wherein the processor is configured to determine the position of the at least one point if the sensed pressure is withing the first specified range in a state that the touch is sensed using the second sensor.

The processor may be configured to sense an approach (hovering proximity) to the display or the touch to the display using the second sensor; the processor may be further configured to activate the first sensor if sensing the approach or the touch; and the processor may be further configured to deactivate the first sensor if failing to sense the approach or the touch.

The processor may be configured to determine, as the position of the at least one point, a position including a first position, in which pressure within the first specified range is sensed and a portion of the front surface area close to the first position.

The processor may be configured to execute a first function corresponding to the at least one graphic object if the sensed pressure is within a second specified range in the area, on which the at least one graphic object is displayed, in a state that the touch is sensed.

The processor may be configured to erase the at least one graphic object and initialize the position of the at least one point if sensing release of a touch to the side surface area using the second sensor.

The electronic device further includes a motion sensor, wherein the processor is configured to determine a use situation of the display based on variation in an angle of the display determined using the motion sensor; and the processor is further configured to determine the position of the at least one point if the display is being used.

The electronic device further includes a second sensor and a first touch panel disposed under the front surface area and a second touch panel disposed under the side surface area, wherein the processor is configured to allow the second sensor to increase a sensitivity of the second touch panel to be greater than a sensitivity of the first touch panel.

The processor may be configured to sense a state of an approach (hovering proximity) using the second sensor; and the processor may be further configured to increase a signal transmission period of the second touch panel after sensing the approach of the user to be greater than a signal transmission period before sensing the approach of the user.

The processor may be configured to sense a state of an approach (hovering proximity) using the second sensor; the processor may be further configured to deactivate a first transmission block, which is configured to transmit a signal to the first touch panel, if failing to sense the approach of the user; and the processor may be further configured to activate the first transmission block after sensing the approach of the user.

According to an example embodiment, a method of displaying an object by an electronic device is provided, the method includes sensing pressure to a side surface area of a display using a sensor included under the side surface area; determining a position of at least one point of the side surface area corresponding to the sensed pressure, if the sensed pressure is within a first specified range; and displaying at least one graphic object on one area corresponding to the determined position of the at least one point.

The determining of the position of the at least one point includes sensing a left hand grip or a right hand grip of a user; and differently determining the position of the at least one point based on sensing the left hand grip and the right hand grip.

The method further includes determining whether the sensed pressure is within a second specified range in the at least one area, on which the at least one graphic object is displayed; and executing a first function corresponding to the at least one graphic object if the sensed pressure is within the second specified range.

The method further includes monitoring release of a touch to the side surface area in a state that the at least one graphic object is displayed; erasing the at least one graphic object displayed on the display if the release of the touch is sensed; and initializing the position of the at least one point.

The determining of the position of the at least one point includes determining, as the position of at least one point, a position including a first position, in which pressure within the first specified range is sensed and a position including a portion of a front surface area of the display in a predetermined proximity of the first position.

The method further includes sensing an approach (hovering proximity) to the display or a touch to the display; and activating an element which senses the pressure if the approach or the touch is sensed.

The determining of the position of the at least one point includes determining a use situation of the display based on variation in an angle of the display; and determining the position of the at least one point if the display is being used.

The method further includes increasing a sensitivity of a first touch panel disposed under the side surface area of the display to be greater than a sensitivity of the second touch panel disposed under a front surface area of the display.

The method further includes sensing an approach (hovering proximity), wherein the increasing of the sensitivity of the first touch panel includes increasing a signal transmission period of the second touch panel after sensing the approach of the user to a signal transmission period greater than the signal transmission period before sensing the approach of the user.

Figure 11:
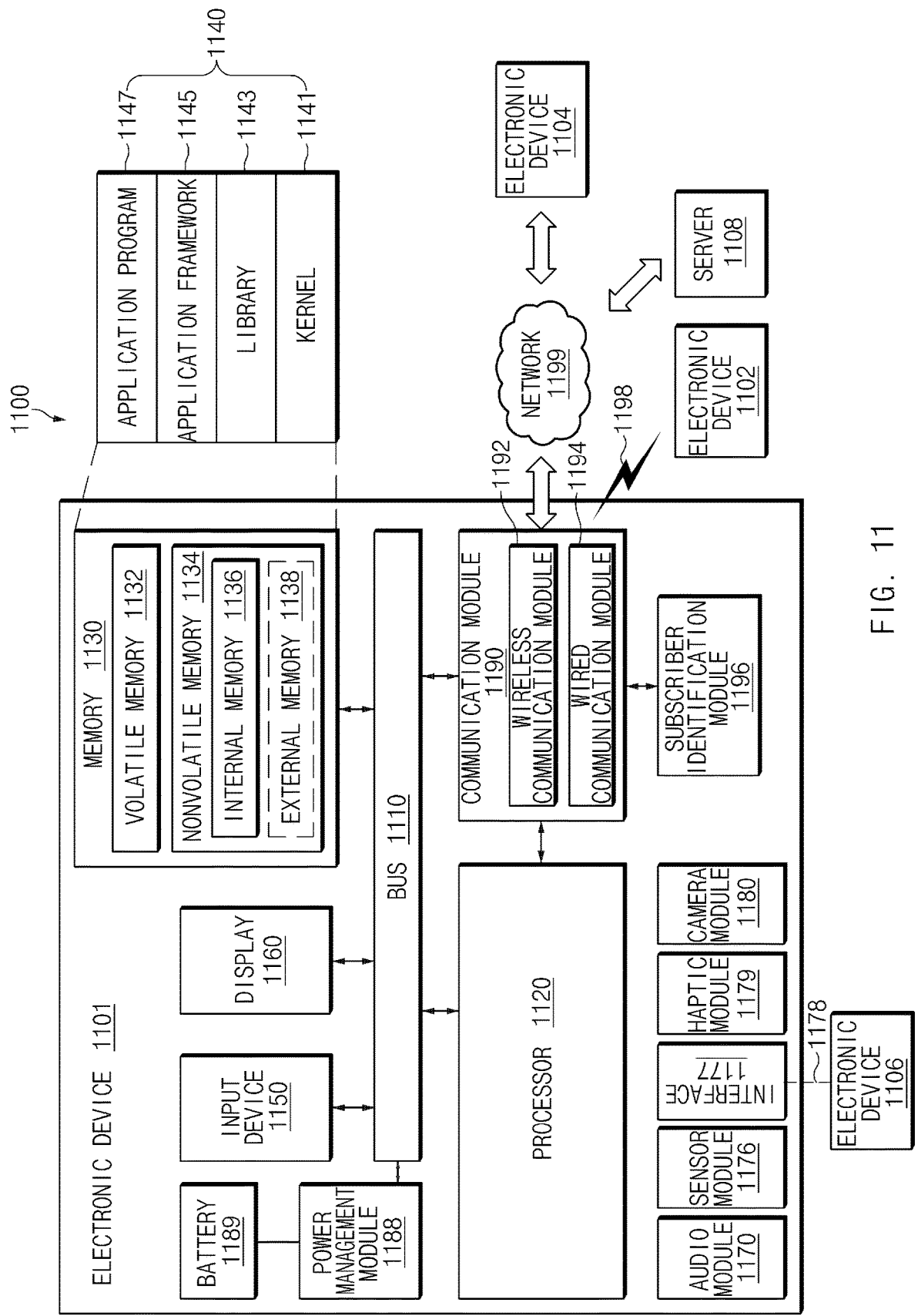
FIG. 11 is a block diagram illustrating an example electronic device capable of varying a display position of an object in a network environment, according to various example embodiments.

FIG. 11 is a block diagram illustrating an example electronic device in a network environment according to various example embodiments of the present disclosure.

FIG. 11 illustrates an electronic device 1101 in a network environment 1100, according to various example embodiments. According to various embodiments disclosed in the present disclosure, the electronic device 1101 may include various types of devices. For example, the electronic device 1101 may include, for example, and without limitation, at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an Motion Picture Experts Group (MPEG-1 or MPEG-2) Audio Layer 3(MP3) player), a portable medical device (e.g., a heart rate, blood glucose, blood pressure, or a thermometer, a camera, or a wearable device, or the like. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit, or the like, but is not limited thereto. According to embodiments, the electronic device may include at least one of, for example, televisions (TVs), digital versatile disc (DVD) players, audios, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame, or the like, but is not limited thereto.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp), or the like, but is not limited thereto. According to an embodiment of the disclosure, the electronic device is not limited to the above-described devices. For example, similarly to a smartphone having function of measuring personal bio-information (e.g., a heart rate or blood glucose), the electronic device may complexly provide functions of multiple devices. In the present disclosure, the term "user" used herein may refer to a person who uses the electronic device or may refer to a device (e.g., an artificial intelligence electronic device) that uses the electronic device.

Referring to FIG. 11, in the network environment 1100, the electronic device 1101 (e.g., an electronic device) may communicate with an electronic device 1102 through local wireless communication 1198 or may communication with an electronic device 1104 or a server 1108 through a network 1199. According an embodiment, the electronic device 1101 may communicate with the electronic device 1104 through the server 1108.

According to an embodiment, the electronic device 1101 may include a bus 1110, a processor 1120 (e.g., at least one processor and/or processing circuitry), a memory 1130, an input device 1150 (e.g., including input circuitry, such as, for example, and without limitation, a micro-phone or a mouse), a display 1160, an audio module (e.g., including audio circuitry) 1170, a sensor module 1176, an interface (e.g., including interface circuitry) 1177, a haptic module (e.g., including haptic circuitry) 1179, a camera module 1180, a power management module 1188, a battery 1189, a communication module (e.g., including communication circuitry) 1190, and a subscriber identification module 1196. According to an embodiment, the electronic device 1101 may not include at least one (e.g., the display 1160 or the camera module 1180) of the above-described elements or may further include other element(s).

For example, the bus 1110 may interconnect the above-described elements 1120 to 1190 and may include a circuit for conveying signals (e.g., a control message or data) between the above-described elements.

The processor 1120 may include various processing circuitry, such as, for example, and without limitation, one or more of a dedicated processor, a central processing unit (CPU), an application processor (application), a graphic processing unit (GPU), a camera image signal processor (ISP) of a camera or a communication processor (CP), or the like. According to an embodiment, the processor 1120 may be implemented with a system on chip (Soc) or a system in package (SiP). For example, the processor 1120 may drive an operating system (OS) or an application to control at least one of another element (e.g., hardware or software element) connected to the processor 1120 and may process and compute various data. The processor 1120 may load an instruction or data, which is received from at least one of other elements (e.g., the communication module 1190), into a nonvolatile memory 1132 to process the instruction or data and may store the process result data into the nonvolatile memory 1134.

The memory 1130 may include, for example, a volatile memory 1132 or a nonvolatile memory 1134. The volatile memory 1132 may include, for example, a random access memory (RAM) (e.g., a dynamic random access memory (DRAM), a static RAM (SRAM), or a synchronous dynamic RAM (SDRAM)). The nonvolatile memory 1134 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 1134 may be configured in the form of an internal memory 1136 or the form of an external memory 1138 which is available through connection only if necessary, according to the connection forms of the electronic device 1101. The external memory 1138 may further include a flash drive such as compact flash (CF), secure digital (SD), micro secure digital (micro-SD), mini secure digital (mini-SD), extreme digital (xD), a multimedia card (MMC), or a memory stick. The external memory 1138 may be operatively or physically connected with the electronic device 1101 in a wired manner (e.g., a cable or a universal serial bus (USB)) or a wireless (e.g., Bluetooth (BT)) manner.

For example, the memory 1130 may store, for example, at least one different software element, such as an instruction or data associated with the program 1140, of the electronic device 1101. The program 1140 may include, for example, a kernel 1141, a library 1143, an application framework 1145 or an application program (interchangeably, "application") 1147.

The input device 1150 may include various input circuitry, such as, for example, and without limitation, a microphone, a mouse, or a keyboard, or the like. According to an embodiment, the keyboard may include a keyboard physically connected or a keyboard virtually displayed through the display 1160.

The display 1160 may include a display, a hologram device or a projector, and a control circuit to control a relevant device. The screen may include, for example, a liquid crystal display (LCD), a light emitting diode (LED) display, an organic LED (OLED) display, a plastic OLED (POLED), a microelectromechanical systems (MEMS) display, or an electronic paper display, or the like, but is not limited thereto. According to an embodiment, the display may be flexibly, transparently, or wearably implemented. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1101.

The audio module 1170 may include various audio circuitry and convert, for example, from a sound into an electrical signal or from an electrical signal into the sound. According to an embodiment, the audio module 1170 may acquire sound through the input device 1150 (e.g., a microphone) or may output sound through an output device (not illustrated) (e.g., a speaker or a receiver) included in the electronic device 1101, an external electronic device (e.g., the electronic device 1102 (e.g., a wireless speaker or a wireless headphone)) or an electronic device 1106 (e.g., a wired speaker or a wired headphone)connected with the electronic device 1101

The sensor module 1176 may measure or detect, for example, an internal operating state (e.g., power or temperature) or an external environment state (e.g., an altitude, a humidity, or brightness) of the electronic device 1101 to generate an electrical signal or a data value corresponding to the information of the measured state or the detected state. The sensor module 1176 may include, for example, and without limitation, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor, or the like. The sensor module 1176 may further include a control circuit for controlling at least one or more sensors included therein. According to an embodiment, the sensor module 1176 may be controlled by using the processor 1120 or a processor (e.g., a sensor hub) separate from the processor 1120. In the case that the separate processor (e.g., a sensor hub) is used, while the processor 1120 is a sleep state, the separate processor may operate without awakening the processor 1120 to control at least a portion of the operation or the state of the sensor module 1176.

According to an embodiment, the interface 1177 may include various interface circuitry, such as, for example, and without limitation, a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface, or the like. A connector 1178 may physically connect the electronic device 1101 and the electronic device 1106. According to an embodiment, the connector 1178 may include, for example, and without limitation, an USB connector, an SD card/MMC connector, or an audio connector (e.g., a headphone connector), or the like.

The haptic module 1179 may include various circuitry and convert an electrical signal into mechanical stimulation (e.g., vibration or motion) or into electrical stimulation. For example, the haptic module 1179 may apply tactile or kinesthetic stimulation to a user. The haptic module 1179 may include, for example, a motor, a piezoelectric element, or an electric stimulator.

The camera module 1180 may capture, for example, a still image and a moving picture. According to an embodiment, the camera module 1180 may include at least one lens (e.g., a wide-angle lens and a telephoto lens, or a front lens and a rear lens), an image sensor, an image signal processor (ISP), or a flash (e.g., a light emitting diode or a xenon lamp).

The power management module 1188, may include various circuitry to manage the power of the electronic device 1101, may constitute at least a portion of a power management integrated circuit (PMIC).

The battery 1189 may include a primary cell, a secondary cell, or a fuel cell and may be recharged by an external power source to supply power at least one element of the electronic device 1101.

The communication module 1190 may include various communication circuitry and establish a communication channel between the electronic device 1101 and an external device (e.g., the first external electronic device 1102, the second external electronic device 1104, or the server 1108). The communication module 1190 may support wired communication or wireless communication through the established communication channel. According to an embodiment, the communication module 1190 may include a wireless communication module 1192 or a wired communication module 1194. The communication module 1190 may communicate with the external device (e.g., the first external electronic device 1102, the second external electronic device 1104 or the server 1108) through a first network 1198 (e.g. a wireless local area network (LAN) such as Bluetooth (BT) or infrared data association (IrDA)) or a second network 1199 (e.g., a wireless wide area network such as a cellular network) through a relevant module among the wireless communication module 1192 or the wired communication module 1194.

The wireless communication module 1192 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the present disclosure, "GPS" and "GNSS" may be interchangeably used.

According to an embodiment, when the wireless communication module 1192 supports cellar communication, the wireless communication module 1192 may, for example, identify or authenticate the electronic device 1101 within a communication network using the subscriber identification module (e.g., a SIM card) 1196. According to an embodiment, the wireless communication module 1192 may include the processor 1120 (e.g., an application processor (AP) and a separate communication processor (CP). In this case, the communication processor may perform at least a portion of functions associated with at least one of elements 1110 to 1196 of the electronic device 1101 in substitute for the processor 1120 when the processor 1120 is in an inactive (sleep) state, and together with the processor 1120 when the processor 1120 is in an active state. According to an embodiment, the wireless communication module 1192 may include a plurality of communication modules, each supporting only a relevant communication scheme among cellular communication, short-range wireless communication, or a GNSS communication scheme.

The wired communication module 1194 may include, for example, include a local area network (LAN) service, a power line communication, or a plain old telephone service (POTS).

For example, the first network 1198 may employ, for example, WiFi direct or Bluetooth for transmitting or receiving instructions or data through wireless direct connection between the electronic device 1101 and the first external electronic device 1102. The second network 1199 may include a telecommunication network (e.g., a computer network such as a LAN or a WAN, the Internet or a telephone network) for transmitting or receiving instructions or data between the electronic device 1101 and the second electronic device 1104.

According to embodiments, the instructions or the data may be transmitted or received between the electronic device 1101 and the second external electronic device 1104 through the server 1108 connected with the second network. Each of the external first and second external electronic devices 1102 and 1104 may be a device of which the type is different from or the same as that of the electronic device 1101. According to various embodiments, all or a part of operations that the electronic device (1101 will perform may be executed by another or a plurality of electronic devices (e.g., the electronic devices 1102 and 1104 or the server 1108. According to an embodiment, in the case that the electronic device 1101 executes any function or service automatically or in response to a request, the electronic device 1101 may not perform the function or the service internally, but may alternatively or additionally transmit requests for at least a part of a function associated with the electronic device 1101 to another device (e.g., the electronic device 1102 or 1104 or the server 1108). The another electronic device (e.g., the electronic device 1102 or 1104 or the server 1108) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

The term "module" as used in the present disclosure may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific IC (ASIC) chip, a field-programmable gate array (FPGA), and a programmable-logic device for performing some operations, or the like, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 1120, may cause the one or more processors to perform a function corresponding to the instruction. The computer-readable storage media, for example, may be the memory 1130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display including a front surface area configured to face a viewer and a side surface area disposed at, at least one side of the front surface area;
a first sensor disposed under the side surface area and configured to sense pressure applied to at least part of the side surface area;
a second sensor configured to sense an input to the display, the input including at least one of a hovering input or a touch input;
a motion sensor; and
a processor operatively connected with at least the display, the first sensor, and the second sensor;
wherein the processor is configured to:
identify the input to the display via the second sensor, in response to the input to the display identified via the second sensor, activate the first sensor;
after activation of the first sensor, identify a pressure of the input via the first sensor;
if the pressure of the input is within a first specified range, determine whether the pressure is a valid pressure based on a variation in an acceleration of the display by using the motion sensor;
if the pressure of the input is valid pressure, determine between whether a right hand grip or a left hand grip resulted in the pressure and determine a position of at least one point of the side surface area corresponding to the sensed pressure; and
cause to be displayed at least one graphic object comprising a functional key at an area based on and corresponding to the determined position and based on the determination of whether the pressure was caused by the right hand grip or the left hand grip.

2. The electronic device of claim 1,
wherein the functional key comprises one or more of a volume key or a power key;
wherein the second sensor is further configured to sense a grip on the display, and wherein the processor is further configured to:
sense the left hand grip and the right hand grip using the second sensor; and
differently determine the position of the at least one point based on sensing the left hand grip and/or the right hand grip.

3. The electronic device of claim 1, wherein the processor is further configured to:
determine, as the position of the at least one point, a position including a first position, in which pressure within the first specified range is sensed and a portion of the front surface area within a predetermined distance to the first position.

4. The electronic device of claim 1, wherein the processor is further configured to:
execute a first function corresponding to the at least one graphic object if the sensed pressure is within a second specified range in the area on which the at least one graphic object is displayed, in a state that the touch is sensed.

5. The electronic device of claim 1, wherein the processor is further configured to:

erase the at least one graphic object and initialize the position of the at least one point if sensing release of a touch to the side surface area using the second sensor.

6. The electronic device of claim 1,
wherein the second sensor includes a first touch panel disposed under the front surface area and a second touch panel disposed under the side surface area, and
wherein the processor is further configured to:
allow the second sensor to increase a sensitivity of the second touch panel to be greater than a sensitivity of the first touch panel.

7. The electronic device of claim 6, wherein the processor is configured to:
sense a state of a hovering proximity using the second sensor; and
increase a signal transmission period of the second touch panel after sensing the hovering proximity to be greater than a signal transmission period before sensing the hovering proximity.

8. The electronic device of claim 6, wherein the processor is configured to:
sense a state of a hovering proximity using the second sensor;
deactivate a first transmission block, which is configured to transmit a signal to the first touch panel, if not sensing the hovering proximity; and
activate the first transmission block after sensing the hovering proximity.

9. A method of displaying an object by an electronic device, the method comprising:
identifying an input to a display via a second sensor, wherein the input includes at least one of a hovering input or a touch input;
activating a first sensor, the first sensor disposed under a side surface area and configured to sense pressure applied to at least part of the side surface area;
after activation of the first sensor, identifying a pressure of the input via the first sensor;
if the pressure is within a first specified range, determining whether the pressure is a valid pressure based on a variation in an acceleration of the display by using a motion sensor;
if the pressure of the input is valid pressure, determining between whether a right hand grip or a left hand grip resulted in the pressure;
determining a position of at least one point of the side surface area corresponding to the sensed pressure; and
displaying at least one graphic object comprising a functional key at an area based on and corresponding to the determined position of the at least one point and based on the determination of whether the pressure was caused by the right hand grip or the left hand grip.

10. The method of claim 9,
wherein the functional key comprises one or more of a volume key or a power key,
wherein the determining of the position of the at least one point includes:
sensing the left hand grip and the right hand grip; and
differently determining the position of the at least one point based on sensing the left hand grip and/or the right hand grip.

11. The method of claim 9, further comprising:
determining whether the sensed pressure is within a second specified range in the at least one area on which the at least one graphic object is displayed; and
executing a first function corresponding to the at least one graphic object if the sensed pressure is within the second specified range.

12. The method of claim 9, further comprising:
monitoring release of a touch to the side surface area in a state that the at least one graphic object is displayed;
erasing the at least one graphic object displayed on the display if the release of the touch is sensed; and
initializing the position of the at least one point.

13. The method of claim 9, wherein the determining of the position of the at least one point includes:
determining, as the position of at least one point, a position including a first position, in which pressure within the first specified range is sensed and a position including a portion of a front surface area of the display in within a predetermined distance of the first position.

14. The method of claim 9, further comprising:
increasing a sensitivity of a first touch panel disposed under the side surface area of the display to be greater than a sensitivity of the second touch panel disposed under a front surface area of the display.

15. The method of claim 14, further comprising:
wherein the increasing of the sensitivity of the first touch panel includes: increasing a signal transmission period of the second touch panel after sensing the hovering input to be greater than a signal transmission period before sensing the approach of the user.

* * * * *